(12) United States Patent
Fukatsu et al.

(10) Patent No.: US 10,867,140 B2
(45) Date of Patent: Dec. 15, 2020

(54) SYSTEM AND METHOD OF READING INFORMATION CODE

(71) Applicant: DENSO WAVE INCORPORATED, Aichi-pref. (JP)

(72) Inventors: Mieko Fukatsu, Chita-gun (JP); Chiaki Baba, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 169 days.

(21) Appl. No.: 15/225,022

(22) Filed: Aug. 1, 2016

(65) Prior Publication Data

US 2017/0032163 A1 Feb. 2, 2017

(30) Foreign Application Priority Data

Jul. 31, 2015 (JP) .................. 2015-151481

(51) Int. Cl.
    *G06K 7/10*     (2006.01)
    *G06K 19/06*     (2006.01)
    *G06K 7/14*     (2006.01)

(52) U.S. Cl.
    CPC ....... *G06K 7/10722* (2013.01); *G06K 7/1417* (2013.01); *G06K 7/1447* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 2007/0174243 A1* | 7/2007 | Fritz | G06F 17/3087 |
| 2012/0125992 A1* | 5/2012 | Nakagawa | G06Q 50/10 |
| | | | 235/375 |
| 2012/0181330 A1* | 7/2012 | Kim | G06Q 30/02 |
| | | | 235/375 |
| 2013/0048714 A1* | 2/2013 | Sharma | G06Q 20/3276 |
| | | | 235/379 |
| 2014/0115708 A1* | 4/2014 | Terwilliger | G06F 21/36 |
| | | | 726/26 |
| 2015/0041530 A1* | 2/2015 | Burkhart | G06K 19/06037 |
| | | | 235/375 |

(Continued)

FOREIGN PATENT DOCUMENTS

| | | |
|---|---|---|
| JP | 2002-351765 A | 12/2002 |
| JP | 2004-46781 A | 2/2004 |

(Continued)

*Primary Examiner* — Scott B Christensen
(74) *Attorney, Agent, or Firm* — Oliff PLC

(57) ABSTRACT

In an information processing terminal, code image data acquired by an imaging unit imaging an information code and terminal identification information stored in a storage unit are transmitted to a server. A control unit performs a process based on information received from the server in response to the transmission. In the server, when code identification information is acquired by an interpreting process from the code image data received from the information processing terminal, a single process among a plurality of processes associated with the acquired code identification information is selected based on the received terminal identification information. Selection information related to the process to be selected is transmitted to the information processing terminal.

18 Claims, 8 Drawing Sheets

(56) References Cited

U.S. PATENT DOCUMENTS

2015/0178721 A1\* 6/2015 Pandiarajan ......... G06Q 20/382
 705/75
2016/0132588 A1\* 5/2016 Duncan .................. G06F 21/31
 235/462.01

FOREIGN PATENT DOCUMENTS

| JP | 2006-24191 A | 1/2006 |
| JP | 2009-151699 A | 7/2009 |
| JP | 2011-170430 A | 9/2011 |
| JP | 2014-144349 A | 8/2014 |

\* cited by examiner

| CODE IDENTIFICATION INFORMATION | TERMINAL IDENTIFICATION INFORMATION | PROCESS TO BE SELECTED |
|---|---|---|
| SERVICE PROVIDER ID | MANAGEMENT ID | MANAGEMENT PROCESS |
| | GENERAL QUERY ID | GENERAL QUERY PROCESS |

FIG.8

| CODE IDENTIFICATION INFORMATION | TERMINAL IDENTIFICATION INFORMATION | PROCESS TO BE SELECTED | APPLICABLE PERIOD |
|---|---|---|---|
| FOR FILE TRANSMISSION | FOR FILE OPERATION | FIRST FILE TRANSMISSION PROCESS | UNTIL JULY |
| | | SECOND FILE TRANSMISSION PROCESS | FROM AUGUST |
| FOR FILE RECEPTION | | FILE RECEPTION PROCESS | NULL |
| FOR FILE EDITING | | FILE EDITING PROCESS | NULL |
| FOR FILE REFERENCE | | FILE REFERENCE PROCESS | NULL |

SYSTEM AND METHOD OF READING INFORMATION CODE

CROSS-REFERENCE TO RELATED APPLICATION

This application is based on and claims the benefit of priority from earlier Japanese Patent Application No. 2015-151481 filed Jul. 31, 2015, the description of which is incorporated herein by reference.

BACKGROUND OF THE INVENTION

Technical Field

The present invention relates to a system and method of reading an information code, and in particularly, to such a system and method that perform a predetermined process using information recorded in the information code.

Related Art

Conventionally, a reading system disclosed in JP-A-2011-170430, for example, is known as an information code reading system that performs a predetermined process using information recorded in an information code, such as a barcode or a QR code (registered trademark).

In this reading system, when table-use mode is confirmed based on mode identification information included in an information code that is read and a table inside a memory of an optical information reading apparatus is a table corresponding to use-table identification information recorded in the information code, individual data corresponding to an individual data number recorded in the information code is retrieved from the table. Then, data in which the individual data number in the information code is converted to the retrieved individual data is generated. Storage content of the memory is updated based on accumulation data of a management apparatus.

In this way, as a result of the system being configured so that some of the data in the information code are converted to data stored in the optical information reading apparatus and interpreted, not all pieces of data are required to be stored in the information code. The information code can be more compactly configured. At the same time, a system that is capable of interpreting a large volume of data is constructed.

In particular, the reading system is configured so that data to be accumulated in a storage unit of the management apparatus is acquired from a server. That is, the server manages the data in the storage unit of the management apparatus, the tables in the memory of the optical information reading apparatus, and the like.

When an information code reading system is configured using a server that is capable of communicating with an information processing terminal, such as the optical information reading apparatus, as described above, a following configuration is known. That is, an image of an information code imaged by the information processing terminal is converted to data and transmitted to the server as code image data. The server then decodes the information code and transmits a decoding result obtained thereby to the information processing terminal. As a result of the server functioning as a decode server in this way, the information code reading system is able to perform a predetermined process using information recorded in the information code, even when the information processing terminal does not have a decoding function.

However, in the configuration in which a predetermined process is performed through use of information recorded in an information code, as described above, only a single process can be performed for a single reading of an information code. That is, only the same reading result can be obtained, even should the same information code be read using different information processing terminals under different circumstances. For example, to change information related to a certain product or the like based on reading conditions and the like, using an information code displayed on the product or the like, a number of information codes amounting to the number of patterns of anticipated reading conditions and the like is required to be displayed. A single information code corresponding to the reading condition or the like, among the plurality of information codes that are displayed, is then required to be read.

In this case, the number of information codes to be displayed increases as the number of patterns of anticipated reading conditions and the like increases. Therefore, a larger display space is required. In addition, a problem arises in that erroneous reading of an information code other than the information code that should be read based on the reading condition or the like is likely to occur. A reading result that is unsuitable for the reading condition or the like is thereby obtained. This problem occurs even when the information processing terminal is a typical information processing terminal that has a decoding function and server decoding is not used.

SUMMARY

In consideration of the foregoing, it is thus desired to provide an information code reading system that enables an information processing terminal to perform different processes, even when a same information code is read.

An exemplary embodiment provides an information code reading system that includes: an information processing terminal that is capable of imaging an information code; and a server that is capable of communicating with the information processing terminal. In the information code, code identification information for differentiating the information code from another information code is recorded, in addition to predetermined information. The information processing terminal includes: a storage means for storing therein terminal identification information for differentiating the information processing terminal from another information processing terminal; an imaging means for imaging the information code; a communication means for communicating with the server; and a control means for transmitting acquired information acquired by the imaging means imaging the information code and the terminal identification information to the server by the communication means, and performing a process based on information received from the server by the communication means in response to the transmission. The server includes: a receiving means for receiving information from the information processing terminal; an acquiring means for acquiring the code identification information from the acquired information received by the receiving means; a selecting means for selecting a single process among a plurality of processes associated with the code identification information acquired by the acquiring means, based on the terminal identification information received by the receiving means; and a transmitting means for transmitting information including selection information related to the process selected by the selecting means to the information processing terminal.

In the foregoing information code reading system, in the information processing terminal, the acquired information acquired by the imaging means imaging the information code and the terminal identification information stored in the storage means are transmitted to the server by the communication means. The control means performs a process based on information received from the server by the communication means in response to the transmission. In the server, when the code identification information is acquired by the acquiring means from the acquired information received from the information processing terminal, the selecting means selects a single process among a plurality of processes associated with the acquired code identification information, based on the terminal identification information received by the receiving means. Information including the selection information related to the process to be selected is transmitted to the information processing terminal by the transmitting means.

As a result, when the same information code is imaged using information processing terminals having different terminal identification information, because the terminal identification information respectively transmitted to the server differs, a different process can be selected for each piece of terminal identification information by the selecting means. Consequently, because the information received from the server in response to the transmission of the acquired information and the terminal identification information also differs, the information processing terminals can perform different processes even when the same information code is read. In particular, in the server, because a single process is selected from a plurality of processes taking into consideration the code identification information in addition to the terminal identification information, a process suitable for the reading condition and the like under which the information code is read can be easily selected. Furthermore, because a set of terminal identification information and code identification information are set for a single desired process, the desired process is not selected by the selecting means simply by a piece of terminal identification information and a piece of code identification information being provided. Therefore, counterfeiting of the information code can be prevented. In addition, determination regarding whether or not to provide service by the present system (authenticity) can be easily made.

In another exemplary embodiment, the transmitting means transmits information including the predetermined information interpreted by an interpreting means, in addition to the selection information, to the information processing terminal. As a result, the server can function as a decode server. The information processing terminal can interpret and acquire the predetermined information from the imaged information code without being provided with an interpreting means or the like. In particular, even in cases in which an encryption process or the like is performed to heighten the level of confidentiality of the information code, a decryption code or the like is not required to be stored in the information processing terminal. Therefore, the level of security of the present system that uses the information code can be easily improved.

Still, in another exemplary embodiment, the information processing terminal includes a display means for displaying information related to the selection information received from the server. Therefore, content of the process selected by the server and the like can be easily viewed.

Still, in another exemplary embodiment, in the server, when imaging is performed within an applicable period of a process that is selected by the selecting means or when the selecting means selects a process for which an applicable period is not set, information including the selection information related to the process to be selected is transmitted to the information processing terminal. When imaging is performed outside of the applicable period of the process that is selected by the selecting means, first information is transmitted to the information processing terminal. The control means performs a process based on the selection information when the selection information is received from the server, and gives notification that imaging is performed outside of the applicable period when the first information is received from the server.

As a result, whether or not to set an applicable period can be determined and the dates of the applicable period can be set for each selectable process. In addition, imaging of an information code outside of the applicable period can be easily confirmed. Therefore, usefulness of the present system can be enhanced. In particular, in the information processing terminal, the notification that imaging is performed outside of the applicable period is given when the first information is received from the server. Therefore, a user of the information processing terminal can easily ascertain the reason the process to be selected from the plurality of processes based on the imaged information code is not performed.

Still, in another exemplary embodiment, in the server, when the information processing terminal is determined to be within a valid area of a process selected by the selecting means or when the selecting means selects a process for which a valid area is not set, information including the selection information related to the process to be selected is transmitted to the information processing terminal. When the information processing terminal is determined to be outside of the valid area of the process selected by the selecting means, second information is transmitted to the information processing terminal. The control means performs a process based on the selection information when the selection information is received from the server, and gives notification that the information processing terminal is outside of the valid area when the second information is received from the server.

As a result, whether or not a valid area is set can be determined and the range of the area can be set for each selectable process. In addition, imaging of an information code at a location outside of the valid area can be easily confirmed. Therefore, usefulness of the present system can be enhanced. In particular, in the information processing terminal, the notification that the information processing terminal is outside of the valid area is given when the second information is received from the server. Therefore, the user of the information processing terminal can easily ascertain the reason the process to be selected from the plurality of processes based on the imaged information code is not performed.

Still, in another exemplary embodiment, in the server, when the terminal identification information is not included in the information received by the receiving means, third information is transmitted to the information processing terminal. The control means performs a process based on the selection information when the selection information is received from the server, and gives notification that an unreadable information code has been imaged when the third information is received from the server.

As a result, an information processing terminal in which the terminal identification information is not stored is not able to perform a process to be selected from a plurality of processes based on the information code that has been imaged. Therefore, the level of security of the present system that uses the information code can be is improved as a result of the terminal identification information being stored in the storage means of the information processing terminal that is permitted to use the present system. In particular, in the information processing terminal, the notification that an unreadable information code has been imaged is given when the third information is received from the server. Therefore, in this case, the user of the information processing terminal is informed that an unreadable information code has been imaged, and cannot know the presence of processes and the like that can be performed by the information code being read. As a result, the level of security of the present system that uses the information code can be further improved.

Still, in another exemplary embodiment, the server includes a managing means for storing and managing the code identification information and the terminal identification information used in selection by the selecting means. As a result, the information related to the process to be selected can be managed, in addition to the information processing terminal and the information code used in the present system. Consequently, the usage state and the like of the present system can be managed in detail.

BRIEF DESCRIPTION OF THE DRAWINGS

In the accompanying drawings:

FIG. 8 is an explanatory diagram of an example of a part of a database constructed as a selection reference in a storage unit of a server, according to the second embodiment.

DETAILED DESCRIPTION OF THE PREFERRED EMBODIMENTS

First Embodiment

A first embodiment actualizing an information code reading system of the present invention will be described with reference to the drawings.

An information code reading system 10 according to the present embodiment is a system that enables an information processing terminal 20 to perform a predetermined process using information recorded in an information code C. More specifically, the information code reading system 10 is configured as a system that uses terminal identification information set for each information processing terminal 20, as described hereafter, and assigns processes so that the information processing terminals 20 perform different processes even when the same information code is read.

Figure 1:
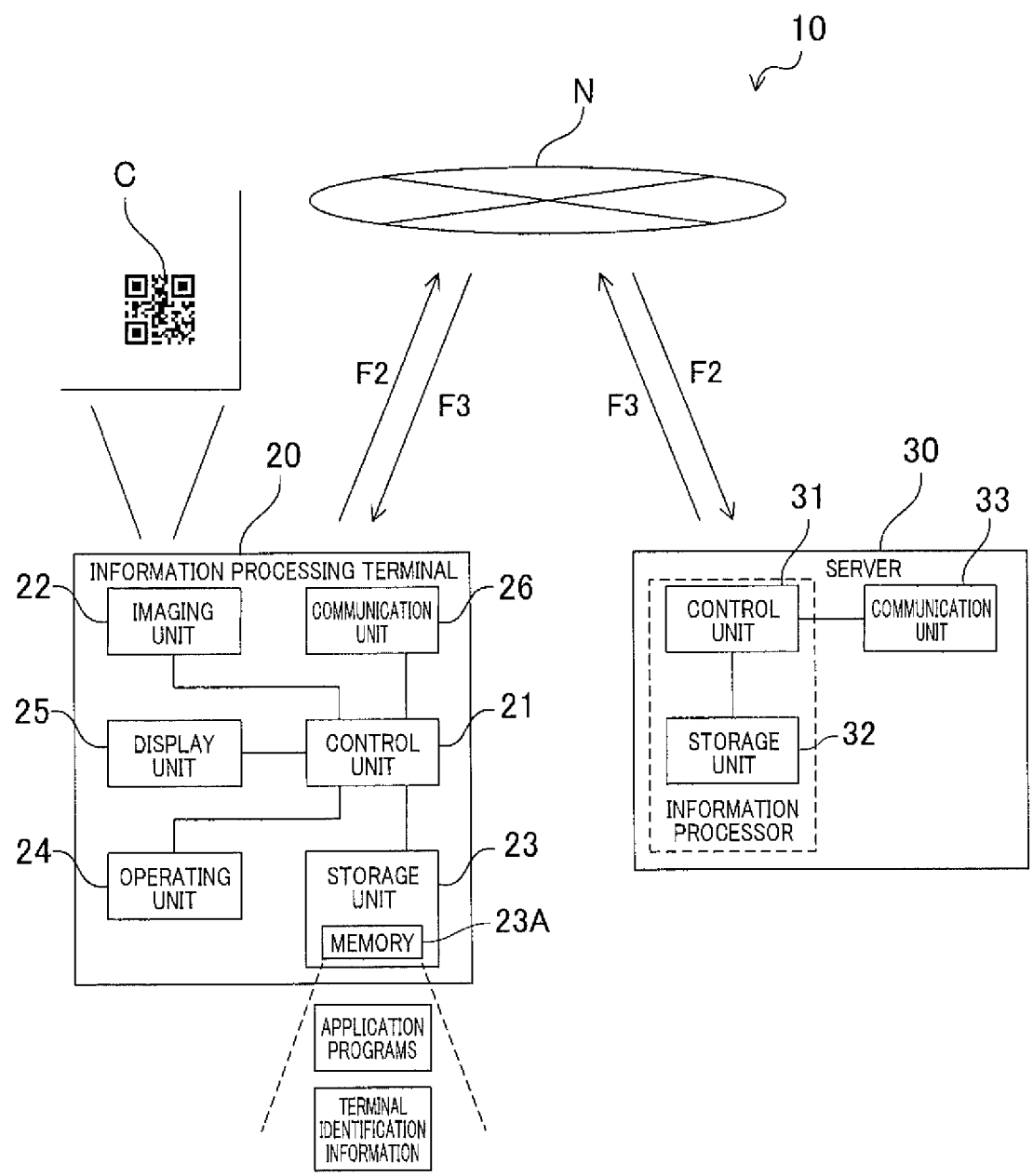
FIG. 1 is an explanatory diagram of an overview of an information code reading system according to a first embodiment.

As shown in FIG. 1, the information code reading system 10 includes an information processing terminal 20 and a server 30. Here, the number of information processing terminals 20 may be one, or two or more. The information processing terminal 20 is capable of imaging an information code. The server 30 is capable of communicating with each information processing terminal 20. The information processing terminal 20 and the server 30 are connected so as to be capable of mutually communicating over a network N, such as the Internet. In FIG. 1, a single information processing terminal 20 is shown for convenience. Other information processing terminals 20 are omitted.

First, an information code C used by the information code reading system 10 will be described.

The information code C is attached to a distributed material distributed by a service provider, or the like. The information code C is configured by an array of a plurality of cells of various types. The cells differ in color, saturation (intensity), or luminance. Specifically, according to the present embodiment, for example, a QR code (registered trademark) is used as the information code C. The QR code is composed of an array of two types of cells, that is, bright-colored cells and dark-cells.

The information code C is generated so that decode data to be decoded for reading and code identification information are recorded in an optically readable manner. The code identification information is used to differentiate the information code from information codes of other formats of use. For example, the code identification information is set to correspond to an identification (ID) of the service provider. The decoded data may correspond to an example of "predetermined information".

The information code C may be configured as a partially non-disclosed code that includes a non-disclosed region and a disclosed region. In the non-disclosed region, information that is encrypted based on a predetermined encryption key is recorded. In the disclosed region, disclosed information that is not encrypted by an encryption key is recorded. The information recorded in the non-disclosed region may be interpreted (decrypted) only in cases in which a decryption key or the like corresponding to the encryption key is available.

In this case, the disclosed region of the partially non-disclosed code is configured as a region that can also be read by a typical reading apparatus that does not have the decryption key or the like, in addition to a reading apparatus has the decryption key or the like.

In addition, the information code C may be configured as an information code in which a blank region is provided within a code region. In this case, as in an information code Ca shown as an example in FIG. 2, the information code can be configured so that another piece of information related to the decode data to be decoded, such as another information code Cb, is arranged in a blank region Cs.

Next, a configuration of the information processing terminal 20 will be described.

The information processing terminal 20 is operable based on a predetermined application program being installed from a portable terminal, such as a smartphone, that is provided with a camera function. The predetermined application program is distributed to, for example, the potable terminal by the service provider or the like. The information processing terminal 20 includes a control unit 21 that processes image data of a captured image, based on pixel signals from an imaging unit 22 that functions as an imaging means.

The control unit 21 is mainly configured by a microcomputer. The control unit 21 includes a central processing unit (CPU), a system bus, an input/output interface, and the like. The control unit 21 functions as an information processing unit, together with a storage unit 23. For example, the storage unit 23 is configured by a publicly known semiconductor memory, such as a read-only memory (ROM), a random access memory (RAM), or a non-volatile memory. The storage unit 23 is thus able to have, as a memory area, a memory 23A which stores therein an application program, described hereafter, and the like so as to be capable of being run by the control unit 21.

In particular, according to the present embodiment, terminal identification information that differs for each installed application program is recorded in the storage unit 23, together with the corresponding application program. That is, the storage unit 23 functions as a storage means in which the terminal identification information is stored. The terminal identification information is set for each information processing terminal 20 and also serves as information for identifying the installed application program. For example, terminal identification information, such as a management ID, is stored in a predetermined memory area of the storage unit 23 in which an application program for management is installed. Terminal identification information, such as a general query ID, is stored another predetermined memory area of in the storage unit 23 in which an application program for general query is installed.

In addition, the information processing terminal 20 includes an operating unit 24, a display unit 25, and a communication unit 26. The operating unit 24 is configured by a plurality of keys and the like. The operating unit 24 provides a function of inputting information to the control unit 21 based on key operation. The display unit 25 is configured by a liquid crystal display or the like. The display unit 25 is controlled by the control unit 21, and provides a function of displaying information and the like obtained through imaging of an information code, and giving notification thereof. The communication unit 26 is controlled by the control unit 21, and functions as a communication means for performing wireless communication with the server 30 and the like, over the network N.

Next, a configuration of the server 30 will be described.

The server 30 is configured as a computer that provides a function as a decode server that decodes the information code C imaged by the information processing terminal 20, based on information received from the information processing terminal 20. In particular, according to the present embodiment, the server 30 functions to select a single process among a plurality of processes associated with the code identification information, based on the code identification information obtained by decoding the information code C and the terminal identification information received from the information processing terminal 20, as described hereafter. That is, the server 30 functions to select a single process among a plurality of processes that are anticipated in advance, based on the code identification information and the terminal identification information.

The server 30 mainly includes a storage unit 32, a communication unit 33, and a control unit 31 that performs overall control of the storage unit 32 and the communication unit 33. The control unit 31 is mainly configured by a microcomputer. The control unit 31 includes a CPU, a system bus, an input/output interface, and the like. The control unit 31 functions as an information processing unit, together with the storage unit 32. For example, the storage unit 32 is configured by a publicly known semiconductor memory, such as a read-only memory (ROM), a random access memory (RAM), or a non-volatile memory. The storage unit 32 stores, in advance, therein an application program, a predetermined database, and the like for performing a decoding process and the like based on information received from the information processing terminal 20, so as to be capable of being used by the control unit 31. The communication unit 33 is controlled by the control unit 31, and provides a function of communicating with each information processing terminal 20 and other external apparatuses over the network N.

In particular, according to the present embodiment, a database is constructed in the storage unit 32 in advance. The database serves as a selection reference for the selection a single process among the plurality of processes based on the code identification information and the terminal identification information, described above. In the database, a single or a plurality of processes are associated in a selectable manner with a single piece of code identification information. When a plurality of processes are associated in a selectable manner with a single piece of code identification information, a single piece of terminal identification information is set to be associated with each process.

Figures 2, 3:
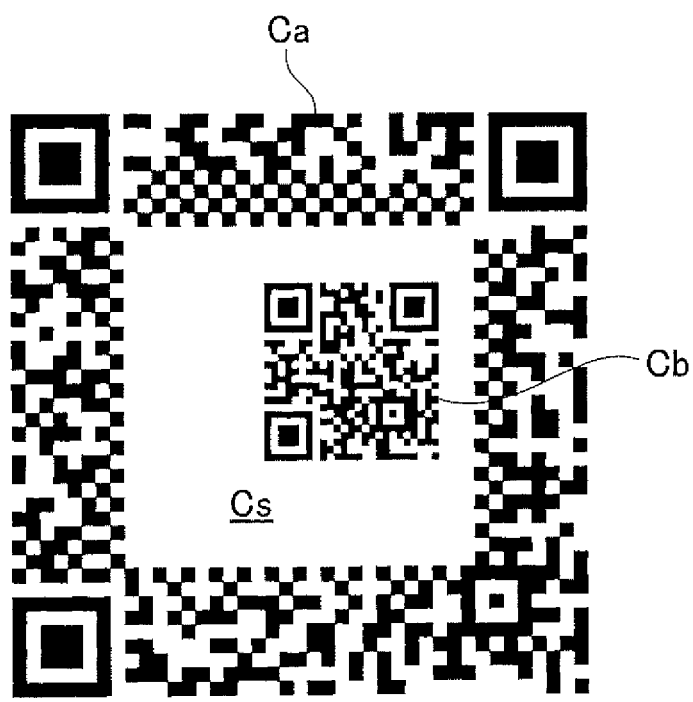
FIG. 2 is an explanatory diagram of a variation example of an information code.
FIG. 3 is an explanatory diagram of an example of a part of a database constructed as a selection reference in a storage unit of a server, according to the first embodiment.

For example, as shown as an example in FIG. 3, either of a management process and a general query process can be selected for the code identification information corresponding to the service provider ID or the like. In this case, the database is constructed so that the terminal identification information, such as the management ID, is associated with the management process and the terminal identification information, such as the general query ID, is associated with the general query process. Here, the management process is, for example, a process that uses the Uniform Resource Locator (URL) of a website for product management allowing access, in a readable and writable manner, to a database on a system server 40 (refer to FIG. 6) on which product management is performed. In addition, the general query process is, for example, a process that uses the URL of a website for product query allowing access to a database on the system server 40, in a manner in which writing of data is prohibited and only reading of data is permitted.

When the data obtained by the information code C being imaged (code image data) is received without the terminal identification information being received from the information processing terminal 20, the server 30 functions as a typical decode server that transmits only the decoded data to the information processing terminal 20.

Next, a process performed using the information recorded in the information code C in the information code reading system 10, configured as described above, will be described with reference to FIG. 4 to FIG. 6. In the description below, the information code C to be read is that in which a product number identifying the product onto which the information code C is adhered is recorded as the decoded data and the service provider ID is recorded as the code identification information. The terminal identification information, such as the management ID, is installed in advance, together with an application program for product management, on an information processing terminal (also referred to, hereafter, as a management terminal 20a) belonging to a manager who performs product management using the service provided by the service provider (also referred to, hereafter, as simply a manager or the like). In addition, the terminal identification information, such as the general query ID, is installed in advance, together with an application program for product query, on an information processing terminal (also referred to, hereafter, as a query terminal 20b) belonging to a general user who performs product query using the service provided by the service provider (also referred to, hereafter, as simply a general user or the like).

Figure 4:
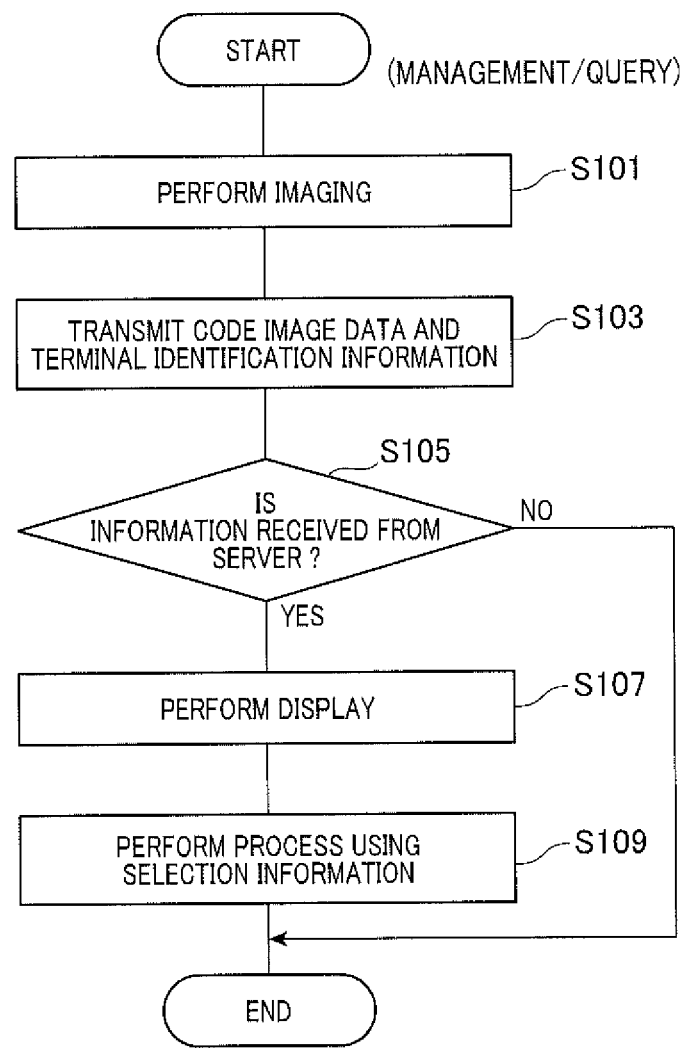
FIG. 4 is a flowchart of an example of the flow of a predetermined terminal process performed by a control unit of an information processing terminal.

First, a predetermined terminal process that is performed by the application program for product management being run by the control unit 21 of the management terminal 20a belonging to the manager or the like will be described in detail, with reference to the flowchart in FIG. 4. The terminal process shown in FIG. 4 is repeated at intervals.

The predetermined terminal process is started when the manager or the like performs a predetermined key operation on the operating unit 24 and the control unit 21 runs the application program for product management. When an operation for imaging is performed in a state in which a camera of the imaging unit 22 is facing the information code C, in an imaging process indicated at step S101 in FIG. 4, the imaging unit 22 performs a process to load and capture an image of the information code C by the imaging unit 22 (see F1a in FIG. 6).

Figure 6:
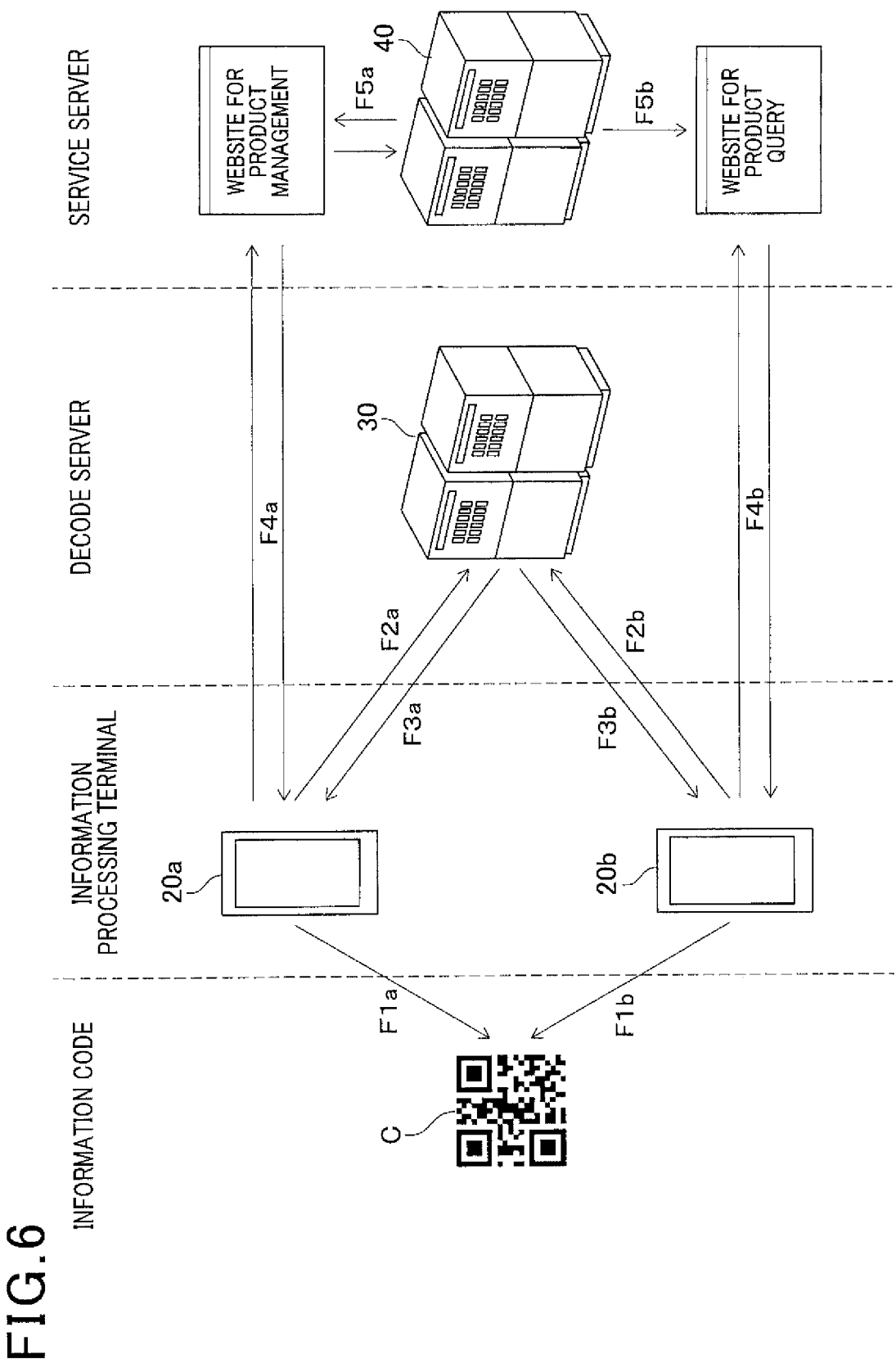
FIG. 6 is an explanatory diagram of an example of the flow of a process performed using information recorded in an information code, according to the first embodiment.

Next, in a process indicated at step S103, when an information code is included in the captured image that has been captured during the imaging process, the control unit 21 transmits the code image data and the terminal identification information, such as the management ID, stored in the storage unit 23 to the server 30, via the communication unit 23, as a decode request (see F2a in FIG. 6). The code image data may correspond to an example of "acquired information acquired by the information code being imaged".

Figure 5:
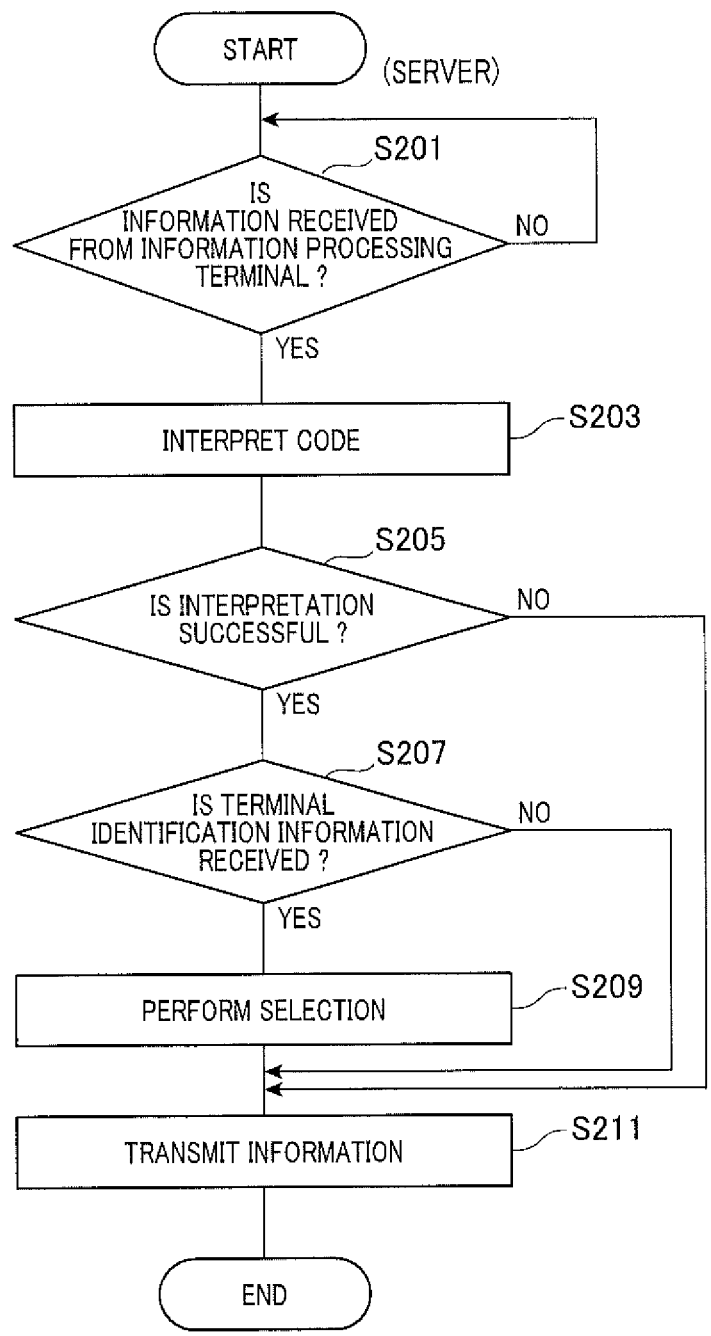
FIG. 5 is a flowchart of an example of the flow of a server decoding process performed by a control unit of the server.

Here, a server decoding process performed by the control unit 31 of the server 30 will be described in detail, with reference to the flowchart in FIG. 5. The server decoding process shown in FIG. 5 is also repeated at intervals.

A process for receiving information from the information processing terminal 20 is performed in the server 30. When the code image data and the terminal identification information are received from the management terminal 20a via the communication unit 33 (Yes at step S201 in FIG. 5), an interpreting process indicated at step S203 is performed. In the interpreting process, the control unit 31 interprets the decoded data and the code identification data by performing a publicly known decoding process on the received code image data. Here, when the information code C is configured as a partially non-disclosed code, a decryption key is required to be stored in the storage unit 32 of the server 30 in advance. In addition, the communication unit 33 corresponds to an example of a "receiving means". Furthermore, the control unit 31 that performs the process at step S203 may correspond to an example of an "acquiring means" and an "interpreting means".

As a result of the received code image data being successfully interpreted in this way (Yes at S205), in a determining process indicated at step S207, the control unit 31 determines whether or not the terminal identification information is received. When determined that the code image data and the terminal identification information are received as described above (Yes at S207), the control unit 31 performs a selecting process indicated at step S209.

In the selecting process indicated at step S209, the control unit 31 selects a single process among a plurality of processes associated with the code identification information, based on the code identification information acquired through interpretation as described above and the received terminal identification information. At this stage, the code identification information corresponding to the service provider ID or the like is acquired through interpretation and the terminal identification information, such as the management ID, is received. Therefore, the control unit 31 selects the management process (see FIG. 3). The control unit 31 and the storage unit 32 that perform the process at step S209 may correspond to an example of a "selecting means".

Then, in a transmitting process indicated at step S211, the control unit 31 transmits information including selection information related to the management process selected as described above and the decoded data interpreted in the interpretation process to the management terminal 20a, via the communication unit 33, as a decode response (see F3a in FIG. 6). The communication unit 33 corresponds to an example of a "transmitting means".

In addition, when determined that the interpretation of the code image data has failed (No at S205), in the transmission process, the control unit 31 transmits information indicating that the interpretation of the code image data has failed to the management terminal 20a, via the communication unit 33. Furthermore, when a simple server decoding is performed, and the code image data is received without the terminal identification information being received from the information processing terminal 20 (No at S207), in the transmission process, the control unit 31 transmits the decoded data interpreted in the interpretation process to the information processing terminal 20, via the communication unit 33.

Meanwhile, in the management terminal 20a, when the selection information related to the management process, the decoded data, and the like are received from the server 30 by the communication unit 26 in response to the transmission of the code image data and the terminal identification information (Yes at S105), the control unit 21 performs a display process indicated at step S107. The control unit 21 displays the received information in the display unit 25 in an executable manner. At this stage, the URL of the website for product management is displayed in the display unit 25 in a usable manner. The display unit 25 may correspond to an example of a "display means".

Then, the control unit 21 performs a process using the selection information indicated at step S109. The management terminal 20a is connected to the website for product management in a manner enabling the database on the system server 40 to be updated (see F4a in FIG. 6). The control unit 21 reads and writes data in the database of the system server 40 by editing information related to a product for which the decoded data (product number) is used, based on operation of the management terminal 20a by the manager or the like (see F5a in FIG. 6). The control unit 21 that performs the processes at steps S103 to S109 may correspond to an example of a "control means".

Next, a predetermined terminal process that is performed by the application program for product query being run by the control unit 21 of the query terminal 20b belonging to the general user or the like will be described in detail, with reference to the flowchart in FIG. 4.

The predetermined terminal process is started when the general user or the like performs a predetermined key operation on the operating unit 24 and the control unit 21 runs the application program for product query. When the query terminal 20b images the information code C (S101;

see F1b in FIG. 6), the control unit 21 transmits the code image data and the terminal identification information, such as the general query ID, stored in the storage unit 23 to the server 30, as a decode request (S103; see F2b in FIG. 6).

In this case, in the server 30, when the code image data and the terminal identification information are received from the query terminal 20b (Yes at S201), and the decoded data and the code identification information are interpreted from the received code image data (S203, Yes at S205, and Yes at S207), the control unit 31 selects a single process among a plurality of processes associated with the code identification information, based on the code identification information acquired through interpretation and the received terminal identification information (S209). At this stage, the code identification information corresponding to the service provider ID or the like is acquired through interpretation and the terminal identification information, such as the general query ID, is received. Therefore, the control unit 31 selects the general query process (see FIG. 3). Then, the control unit 31 transmits information including selection information related to the general query process selected as described above to the query terminal 20b, as decode response (S211, see F3b in FIG. 6).

Meanwhile, in the query terminal 20b, when the selection information related to the general query process and the like are received from the server 30 in response to the transmission of the code image data and the terminal identification information (Yes at S105), the control unit 21 displays the received information in the display unit 25 in an executable manner (S107). Then, the control unit 21 performs a process using the selection information indicated at step S109. The query terminal 20b is connected to the website for product query in a manner enabling the database on the system server 40 to be referenced (see F4a in FIG. 6). The control unit 21 reads data in the database of the system server 40 by referencing information related to a product for which the decoded data (product number) is used, based on operation of the query terminal 20b by the general user or the like (see F5b in FIG. 6).

As described above, in the information code reading system 10 according to the present embodiment, the code image data (acquired information) is acquired in the information processing terminal 20 (20a, 20b) by the imaging unit 22 imaging the information code C. The control unit 21 then transmits the code image data and the terminal identification information stored in the storage unit 23 to the server 30, via the communication unit 26. The control unit 21 receives information from the server 30, via the communication unit 26, in response to the transmission, and performs a process based on the received information. In the server 30, when the code identification information is acquired in the interpreting process (S203) from the code image data received from the information processing terminal 20, the control unit 31 selects a single process among a plurality of processes associated with the acquired code identification information, based on the received terminal identification information. The control unit 31 then transmits information including the selection information related to the process to be selected to the information processing terminal 20.

As a result, when the information processing terminals (20a and 20b) that have different terminal identification information are used to image the same information code C, because the terminal identification information respectively transmitted to the server 30 differs, a different process can be selected for each piece of terminal identification information in the server 30. Consequently, because the information received from the server 30 in response to the transmission of the code identification information and the terminal identification information also differs, the information processing terminals (20a and 20b) can perform different processes even when the same information code C is read. In particular, in the server 30, because a single process is selected from a plurality of processes taking into consideration the code identification information, in addition to the terminal identification information, a process suitable for the reading condition or the like under which the information code C is read can be easily selected. Furthermore, because a set of terminal identification information and code identification information is set for a single desired process, the desired process is not selected simply by a piece of terminal identification information and a piece of code identification information being provided. Therefore, counterfeiting of the information code can be prevented. In addition, determination regarding whether or not to provide service by the present system (for example, a judgement about authenticity) can be easily made.

In addition, a different process can be performed in the information processing terminal 20, even when the same information code C is imaged, by a different piece of terminal identification information being stored as a result of a different application program being installed in the information processing terminal 20 or the like. Therefore, even when the decoded data in the information code C cannot be changed because the information code C is printed or the like, a different process is selected based on the terminal identification information stored in the storage unit 23. Consequently, the decoded data of the information code C that is printed or the like can essentially be changed. Usefulness of the present system can be enhanced.

In particular, the decoded data (predetermined information) interpreted in the interpreting process (S203) is transmitted, in addition to the selection data, to the information processing terminal 20. As a result, the server 30 functions as the decode server. The information processing terminal 20 can interpret and acquire the decoded data from the information code C that has been imaged, without being provided with an interpreting means for the information code C or the like. In particular, even in cases in which a partially non-disclosed code is used and an encryption process or the like is performed to heighten the level of confidentiality of the information code C, a decryption code or the like is not required to be stored in the information processing terminal 20. Therefore, the level of security of the present system that uses the information code C can be easily improved.

Furthermore, the information processing terminal 20 includes the display unit 25 that displays the information related to the selection information received from the server 30. Therefore, the content of the process selected by the server 30 can be easily viewed.

As a variation example according to the present embodiment, when the code image data is received without the terminal identification information being received from the information processing terminal 20 (No at S207), the server 30 may transmit information indicating that an unreadable information code has been imaged, without transmitting the decoded data, to the information processing terminal 20. In this case, in the information processing terminal 20, a notification that an unreadable information code has been imaged is given by being displayed in the display unit 25 or the like, under the control of the control unit 21. Information indicating that an unreadable information code has been imaged may correspond to an example of "third information".

As a result, an information processing terminal in which the terminal identification information is not stored is not able to perform a process to be selected from a plurality of processes based on the information code C that has been imaged. Therefore, the level of security of the present system that uses the information code C can be improved as a result of the terminal identification information being stored in the storage unit 23 of the information processing terminal 20 that is permitted to use the present system.

Second Embodiment

Next, an information code reading system according to a second embodiment of the present invention will be described with reference to FIG. 7 and FIG. 8.

The information code reading system 10 according to the second embodiment differs from the information code reading system according to the first embodiment, described above, in that a command among a plurality of commands prepared in advance is designated in a selectable manner, even when the same information code is imaged. Therefore, constituent sections that are essentially identical to those of the information code reading system according to the first embodiment are given the same reference numbers. Descriptions thereof are omitted.

According to the present embodiment, a file operation application program that performs transmission and reception, as well as reading and writing, of some of the files stored in the storage unit 32 of the server 30 is used. A desired process can be selected based on an inputted command, as a result of an information processing terminal (also referred to, hereafter, as a file operation terminal 20*c*) on which the file operation application program is installed, together with predetermined terminal identification information (also referred to, hereafter, as terminal identification information for file operation) imaging an information code prepared based on application. According to the present embodiment, as shown in FIG. 7, an information code C1 for file transmission, an information code C2 for file reception, an information code C3 for file editing, and an information code C4 for file reference are prepared.

In the information code C1, the decoded data to be read and code identification information that sets file transmission as the application (also referred to, hereafter, as code identification information for file transmission) are recorded. In the information code C2, the decoded data to be read and code identification information that sets file reception as the application (also referred to, hereafter, as code identification information for file reception) are recorded. In the information code C3, the decoded data to be read and code identification information that sets file editing as the application (also referred to, hereafter, as code identification information for file editing) are recorded. In the information code C4, the decoded data to be read and code identification information that sets file reference as the application (also referred to, hereafter, as code identification information for file reference) are recorded.

The decoded data recorded in the information codes C1 to C4 is the same piece of data. The decoded data is recorded as information used for acquisition of a URL of a website from the server 30. For example, the website is a downloading website from which the file operation application program can be downloaded. Therefore, an information processing terminal in which a typical application program for server decoding is installed and that does not have the above-described terminal identification information for file operation (also referred to, hereafter, as a typical terminal 20*d*) can acquire the URL of the downloading website by receiving a decode request from the server 30, regardless of which of the information codes C1 to C4 is imaged.

As shown in FIG. 8, in the database of the server 30, the code identification information for file transmission and the terminal identification information for file operation are associated with a process that designates a command that sets file transmission as the application. The code identification information for file reception and the terminal identification information for file operation are associated with a process that designates a command that sets file reception as the application. The code identification information for file editing and the terminal identification information for file operation are associated with a process that designates a command that sets file editing as the application. The code identification information for file reference and the terminal identification information for file operation are associated with a process that designates a command that sets file reference as the application.

In particular, according to the present embodiment, an applicable period is set for some of the processes to be selected. Specifically, as shown in FIG. 8, for the process that sets file transmission as the application, a process that is selected when the information code C1 is imaged until the end of July (first file transmission process in FIG. 8) and a process that is selected when the information code C1 is imaged from August onward (second file transmission process in FIG. 8) are prepared. As a result, even when the same information code C1 is imaged using the file operation terminal 20*c* in which the same terminal identification information is stored, the process to be selected can be changed depending on the date of imaging. According to the present embodiment, an applicable period is not set for processes other than the process that sets file transmission as the application.

A process performed in the information code reading system 10 using the information recorded in the information codes C1 to C4, according to the present embodiment, will be described below, with reference to FIG. 7 to FIG. 8.

Figure 7:
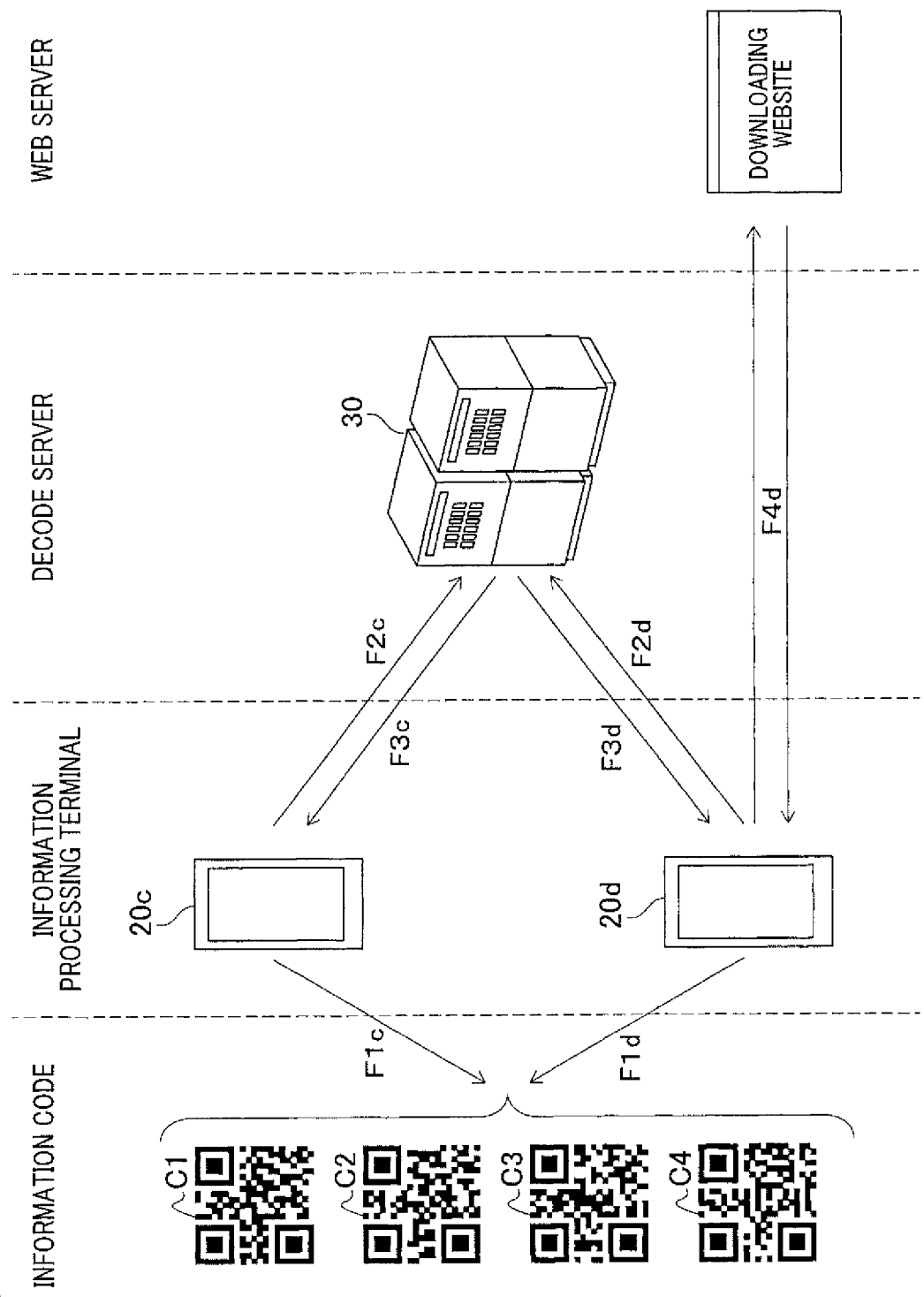
FIG. 7 is an explanatory diagram of an example of the flow of a process performed using information recorded in an information code, according to a second embodiment.

When the file operation terminal 20*c* images the information code C1 (S101 in FIG. 4; see F1*c* in FIG. 7), the control unit 21 transmits the code image data and the terminal identification information for file operation stored in the storage unit 23 to the server 30, as a decode request (S103; see F2*c* in FIG. 7).

In this case, in the server 30, when the code image data and the terminal identification information are received from the file operation terminal 20*c* (Yes at S201 in FIG. 5) and the above-described decoded data and code identification information are interpreted from the received code image data (S203, Yes at S205, and Yes at S207), the control unit 31 selects a single process among a plurality of processes associated with the code identification information, based on the code identification information that has been acquired through interpretation and the received terminal identification information (S209). At this stage, the code identification information for file transmission is acquired through interpretation and the terminal identification information for file operation is received. Therefore, the control unit 31 selects the first file transmission process for imaging performed until July, and selects the second file transmission process for imaging performed from August (see FIG. 8). The control unit 31 then transmits information including selection information related to the file transmission process, selected as described above, to the file operation terminal 20*c* as a decode response (S211, see F3*c* in FIG. 7).

Meanwhile, in the file operation terminal 20c, when the selection information related to the file transmission process and the like are received from the server 30 in response to the transmission of the code image data and the terminal identification information (Yes at S105), the control unit 21 displays the received information in the display unit 25 in an executable manner (S107). In the process using the selection information indicated at step S109, the control unit 21 performs the process that sets file transmission as the application.

In addition, when the file operation terminal 20c images the information code C2, the control unit 21 transmits the code image data and the terminal identification information for file operation stored in the storage unit 23 to the server 30, as a decode request. In this case, in the server 30, when the code image data and the terminal identification information are received from the file operation terminal 20c, and the above-described decoded data and code identification information for file reception are interpreted from the received code image data, the control unit 31 selects the file reception process (see FIG. 8). The control unit 31 then transmits information including selection information related to the file reception process, selected as described above, to the file operation terminal 20c as a decode response. Meanwhile, in the file operation terminal 20c, when the selection information related to the file reception process and the like are received from the server 30 in response to the transmission of the code image data and the terminal identification information, the control unit 21 displays the received information in the display unit 25 in an executable manner. In the process using the selection information indicated at step S109, the control unit 21 performs the process that sets file reception as the application.

In addition, when the file operation terminal 20c images the information code C3, the control unit 21 transmits the code image data and the terminal identification information for file operation stored in the storage unit 23 to the server 30, as a decode request. In this case, in the server 30, when the code image data and the terminal identification information are received from the file operation terminal 20c, and the above-described decoded data and code identification information for file editing are interpreted from the received code image data, the control unit 31 selects the file editing process (see FIG. 8). The control unit 31 then transmits information including selection information related to the file editing process, selected as described above, to the file operation terminal 20c as a decode response. Meanwhile, in the file operation terminal 20c, when the selection information related to the file editing process and the like are received from the server 30 in response to the transmission of the code image data and the terminal identification information, the control unit 21 displays the received information in the display unit 25 in an executable manner. In the process using the selection information indicated at step S109, the control unit 21 performs the process that sets file editing as the application.

In addition, when the file operation terminal 20c images the information code C4, the control unit 21 transmits the code image data and the terminal identification information for file operation stored in the storage unit 23 to the server 30, as a decode request. In this case, in the server 30, when the code image data and the terminal identification information are received from the file operation terminal 20c, and the above-described decoded data and code identification information for file reference are interpreted from the received code image data, the control unit 31 selects the file reference process (see FIG. 8). The control unit 31 then transmits information including selection information related to the file reference process, selected as described above, to the file operation terminal 20c as a decode response. Meanwhile, in the file operation terminal 20c, when the selection information related to the file reference process and the like are received from the server 30 in response to the transmission of the code image data and the terminal identification information, the control unit 21 displays the received information in the display unit 25 in an executable manner. In the process using the selection information indicated at step S109, the control unit 21 performs the process that sets file reference as the application.

In addition, when the typical terminal 20d images any of the information codes C1 to C4 (see F1d in FIG. 7), the control unit 21 transmits the code image data to the server 30 as a decode request (see F2d in FIG. 7). In this case, in the server 30, when the code image data is received from the typical terminal 20d and the above-described decoded data is interpreted from the received code image data, because the terminal identification information for file operation is not received (No at S207), the control unit 31 transmits the decoded data to the typical terminal 20d as a decode response (see F3d in FIG. 7). Meanwhile, in the typical terminal 20d, when the decoded data is received from the server 30 in response to the transmission of the code image data, the control unit 21 displays the received decoded data in the display unit 25 in an executable manner. As a result of the downloading website being accessed using the decoded data, the typical terminal 20d enters a state allowing the file operation application program to be downloaded (see F4d in FIG. 7).

As described above, in the information code reading system 10 according to the present embodiment, the code image data (acquired information) is acquired in the information processing terminal 20 (20c) by the imaging unit 22 imaging any of the information codes C1 to C4. The control unit 21 then transmits the code image data and the terminal identification information stored in the storage unit 23 to the server 30, via the communication unit 26. The control unit 21 receives information from the server 30, via the communication unit 26, in response to the transmission, and performs a process based on the received information. In the server 30, when the code identification information is acquired in the interpreting process (S203) from the code image data received from the information processing terminal 20, the control unit 31 selects a single process among a plurality of processes associated with the acquired code identification information, based on the received terminal identification information. The control unit 31 then transmits information including the selection information related to the process to be selected to the information processing terminal 20.

In this configuration as well, in a manner similar to that according to the above-described first embodiment, the information processing terminal can perform different processes even when the same information code C is read.

As a first variation example according to the above-described embodiment, in the server 30, when the imaging date is within the applicable period of the process that is selected in the selecting process or when a process for which an applicable period is not set is selected in the selecting process, the control unit 21 may transmit information including the selection information related to the process to be selected to the information processing terminal 20. When the imaging date is outside of the applicable period of the process that is selected in the selecting process, the control unit 31 may transmit information indicating that the imaging date is outside of the applicable period, to the information processing terminal 20. In this case, in the information processing terminal 20, when the selection information is received from the server 30, the control unit 21 performs the process based on the selection information. When the information indicating that the imaging date is outside of the applicable period is received from the server 30, the control unit 21 gives notification that the imaging date is outside of the applicable period by performing display in the display unit 25 or the like. The information indicating that the imaging date is outside of the applicable period may correspond to "first information".

As a result, whether or not to set an applicable period can be determined and the dates of the applicable period can be set for each selectable process. In addition, imaging of an information code outside of the applicable period can be easily confirmed. Therefore, usefulness of the present system can be enhanced. In particular, in the information processing terminal 20, the notification that the imaging date is outside of the applicable period is given when the information indicating that the imaging date is outside of the applicable period is received from the server 30. Therefore, the user of the information processing terminal 20 can easily ascertain the reason the process to be selected from the plurality of processes based on the imaged information code is not performed.

In addition, as a second variation example according to the above-described embodiment, the information processing terminal 20 may include a position information acquiring means. The position information acquiring means acquires position information of the information processing terminal 20 based on position signals, such as global positioning system (GPS) signals, that are received. Through use of the position information, the control unit 31 of the server 30 may determine whether or not the information processing terminal 20 is within a valid area in which the imaged information code can be used. The control unit 31 of the server 30 that performs this determination process may correspond to an example of a "determining means".

Specifically, the information processing terminal 20 transmits the code information data, the terminal identification information, and the position information acquired by the position information acquiring means to the server 30. In the server 30, when the information processing terminal 20 is determined to be within the valid area of the process that is selected in the selection process or when a process for which a valid area is not set is selected in the selection process, the control unit 31 may transmit information including the selection information related to the process to be selected to the information processing terminal 20.

When the information processing terminal 20 is determined to be outside of the valid area for the process that is selected in the selection process, the control unit 31 may transmit information indicating that the information processing terminal 20 is outside of the valid area to the information processing terminal 20. In this case, when the selection information is received from the server 30, the control unit 21 of the information processing terminal 20 performs the process based on the selection information. When the information indicating that the information processing terminal 20 is outside of the valid area is received from the server 30, the control unit 21 gives notification that the information processing terminal 20 is outside of the valid area by performing display in the display unit 25 or the like. The information indicating that the information processing unit 20 is outside of the valid area may correspond to an example of "second information".

As a result, whether or not a valid area is set can be determined and the range of the area can be set for each selectable process. In addition, imaging of an information code at a location outside of the valid area can be easily confirmed. Therefore, usefulness of the present system can be enhanced. In particular, in the information processing terminal 20, the notification that the information processing terminal 20 is outside of the valid area is given when the information indicating that the information processing terminal 20 is outside of the valid area is received from the server 30. Therefore, the user of the information processing terminal 20 can easily ascertain the reason the process to be selected from the plurality of processes based on the imaged information code is not performed.

Other Embodiments

The present invention is not limited to the above-described embodiments and the variation examples. For example, the present invention may be actualized in the following manner.

(1) The server 30 may store and manage the code identification information and the terminal identification information used for selection in the selection process in the storage unit 32, as a processing log or the like. In this case, the control unit 31 functions as a managing means for managing usage state and the like of the present system using the processing log and the like stored in the storage unit 32. As a result, the information related to the process to be selected can be managed, in addition to the information processing terminal and the information code used in the present system. Consequently, the usage state and the like of the present system can be managed in detail.

(2) The information (acquired information) that is acquired by the information code being imaged and is transmitted to the server 30 is not limited to the code image data. The information may be a decoding result obtained by the information processing terminal 20 that has the decoding function performing decoding. Alternatively, the information may be data obtained in the course of decoding (such as information indicating the state of array of the light-colored cells and the dark-colored cells configuring the information code). In this configuration as well, the server 30 can acquire the code identification information based on the information received from the information processing terminal 20. The control unit 31 that performs a process to acquire the code identification information from the decoding result, the data obtained in the course of decoding, or the like may correspond to an example of the "acquiring means".

(3) The setting of the code identification information stored in the information code C is not limited to the service provider ID and the like, or file transmission, file reception, file editing, and file reference. The code identification information may be set as information for differentiating the information code C from information codes of other formats of use, based on information such as a creator ID, application, date of creation, and the like.

(4) Application of the present invention is not limited to the information code reading system that manages product information and the like, or the information code reading system that edits files on a server and the like. The present invention may be applied to an information code reading system that enables the information processing terminals 20 that have different terminal identification information to perform processes that differ for each information processing terminal 20, even when the same information code is imaged.

Figure 9:
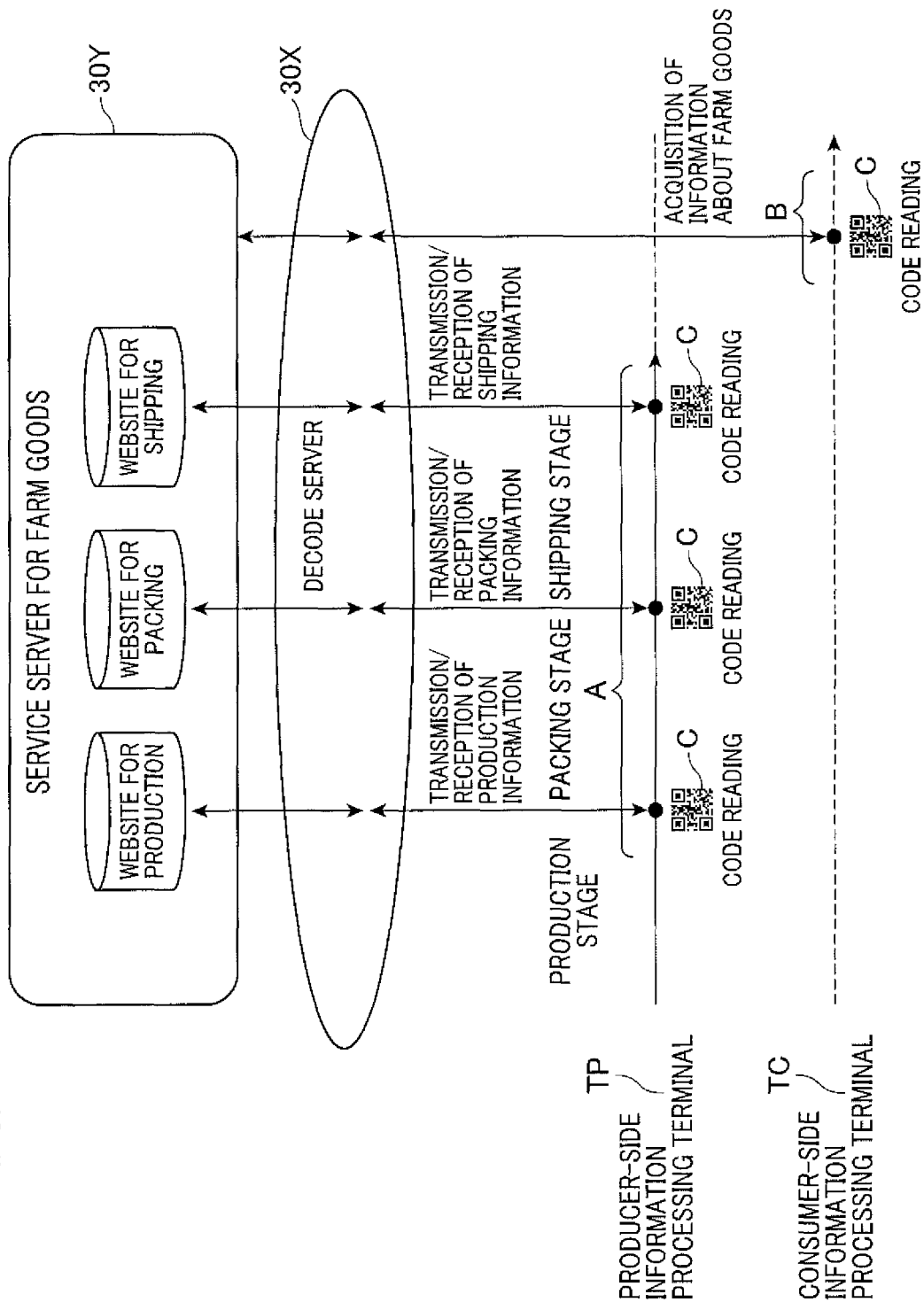
FIG. 9 is an explanatory diagram pictorially explaining how the information code reading system works when this system is applied to a traceability of farm goods.

For example, as exemplified in FIG. 9, the present invention may be applied to an information code reading system that is used for traceability to manage distribution channels of farm goods. In this system for the tractability, the same information code C is used on both producer and consumer sides. At each of the production, packing, and shipping stages, producers can obtain information about the production, packing and shipping stages of farm goods by accessing, from their information processing terminals TP to a decode server30X and to a service server 30Y for farm goods (step A in FIG. 9). Consumers can also access, from their information processing terminals TC to the decode server30X and to the service server 30Y for farm goods (step B in FIG. 9). Thus this information code reading system enables a different process to be performed at each stage of distribution, even with the same information code.

In addition, when the present invention is applied to a system for managing distribution related to agricultural produce, for example, through use of a single information code, information related to production and packaging of the agricultural produce and the like can be acquired on the producer side, and information related to the producer of the agricultural produce can be acquired on the buyer side. In addition, when the present invention is applied to a system for managing a product or the like that requires stock-checking of inventory, for example, through use of a single information code, a URL of a website for stock-taking can be acquired on the stock-taker side, and a URL of a website displaying detailed information on the product can be acquired on the general user side.

(5) Furthermore, the present invention can also be linked to the server 30 of the information code reading system 10 operated in country A and the server 30 of the information code reading system 10 operated in country B. In this case, when the information processing terminal 20 in country B images the information code C used in country A, the server 30 in country B transmits a URL that can be used in country A or the like to the information processing terminal 20. As a result, services and the like provided in country A can also be received in country B. Usefulness of the present system can be enhanced.

EXPLANATION OF REFERENCE NUMBERS

10: information code reading system
20, 20a to 20c: information processing terminal
21: control unit (control means)
22: imaging unit (imaging means)
23: storage unit (storage means)
26: communication unit (communication means)
30: server
31: control unit (acquiring means, selecting means, determining means)
32: storage unit (selecting means)
33: communication unit (receiving means, transmitting means)
C, C1 to C4: information code

What is claimed is:

1. A system for reading an information code, the system comprising:
a server; and
an information processing terminal comprising:
a storage configured to store a terminal identifier for differentiating the information processing terminal from another information processing terminal;
a camera configured to image an information code; and
a first processor programmed to:
acquire, from the image of the information code, information including: i) decode information to be decoded, and ii) a code identifier for differentiating the information code from another information code;
transmit, as a decode request, the acquired information and the terminal identifier to the server via a network; and
perform one of a plurality of processes based on a decode response received from the server via the network responsive to imaging of the information code,
the server comprising:
a database configured to store: a plurality of code identifiers including the code identifier, a plurality of terminal identifiers including the terminal identifier, and the plurality of processes, such that more than one process is associated with either one of the plurality of terminal identifiers or one of the plurality of code identifiers;
a receiver configured to receive the acquired information and the terminal identifier transmitted from the information processing terminal via the network;
a second processor programmed to:
decode the decode information to acquire decoded data;
access the database to select, among the plurality of processes, the one process associated in the database with both the acquired code identifier and the received terminal identifier such that different processes are associated with different terminal identifiers for a same image of the information code; and
transmit, as the decode response, the decoded data and selection information identifying the one process, to the information processing terminal via the network.

2. The system according to claim 1, wherein the second processor is programmed to:
decode the decode information based on the acquired information;
interpret the code identifier based on the acquired information; and
transmit the interpreted code identifier to the information processing terminal.

3. The system according to claim 2, wherein:
the information processing terminal includes a display configured to display information related to the selection information received from the server.

4. The system according to claim 3, wherein:
at least one of the plurality of processes has an applicable period set in advance,
the second processor is programmed to transmit information including the selection information related to the process to be selected to the information processing terminal by the network when imaging is performed within the applicable period of the selected process or the selected process does not have an applicable period set, and transmit first information to the information processing terminal by the network when imaging is performed outside of the applicable period of the selected process, and
the first processor is programmed to perform a process based on the selection information when the selection information is received from the server by the network, and give notification that imaging is performed outside of the applicable period when the first information is received from the server by the network.

5. The system according to claim 1, wherein:
the information processing terminal includes a display configured to display information related to the selection information received from the server.

6. The system according to claim 5, wherein:
the one process has an applicable period set in advance;
the second processor is programmed to transmit the selection information to the information processing terminal by the network when imaging is performed within the applicable period, and transmit first information to the information processing terminal by the network when imaging is performed outside of the applicable period; and
the first processor is programmed to perform the one process based on the selection information when the selection information is received from the server by the network, and give notification that imaging is performed outside of the applicable period when the first information is received from the server by the network.

7. The system according to claim 6, wherein:
the one process has a valid area set in advance;
the information processing terminal includes a locator that acquires position information of the information processing terminal based on a received position signal;
the second processor is programmed to determine whether or not the information processing terminal is positioned within the valid area based on the position information acquired from the information processing terminal;
the second processor is programmed to instruct the network to transmit the selection information to the information processing terminal when the information processing terminal is determined to be within the valid area, and transmit second information to the information processing terminal when the information processing terminal is determined to be outside the valid area; and
the first processor is programmed to:
instruct the network to transmit the position information acquired by the locator, in addition to the acquired information and the terminal identifier, to the server;
perform the one process based on the selection information when the selection information is received from the server by the network in response to the transmission; and
give notification that the information processing terminal is outside of the valid area when the second information is received from the server by the network in response to the transmission.

8. The system according to claim 1, wherein:
the one process has an applicable period set in advance;
the second processor is programmed to transmit the selection information to the information processing terminal by the network when imaging is performed within the applicable period, and transmit first information to the information processing terminal by the network when imaging is performed outside of the applicable period; and
the first processor is programmed to perform the one process based on the selection information when the selection information is received from the server by the network, and give notification that imaging is performed outside of the applicable period when the first information is received from the server by the network.

9. The system according to claim 8, wherein:
the one process has a valid area set in advance;
the information processing terminal includes a locator that acquires position information of the information processing terminal based on a received position signal;
the second processor is programmed to determine whether or not the information processing terminal is positioned within the valid area based on the position information acquired from the information processing terminal;
the second processor is programmed to transmit the selection information to the information processing terminal by the network when the information processing terminal is determined to be within the valid area, and transmit second information to the information processing terminal when the information processing terminal is determined to be outside the valid area; and
the first processor is programmed to:
transmit the position information acquired by the locator, in addition to the acquired information and the terminal identifier, to the server by the network;
perform the one process based on the selection information when the selection information is received from the server by the network in response to the transmission; and
give notification that the information processing terminal is outside of the valid area when the second information is received from the server by the network in response to the transmission.

10. The system according to claim 9, wherein:
the one process has an applicable period set in advance;
the second processor is programmed to transmit the selection information to the information processing terminal by the network when imaging is performed within the applicable period, and transmit first information to the information processing terminal by the network when imaging is performed outside of the applicable period; and
the first processor is programmed to perform the one process based on the selection information when the selection information is received from the server by the network, and give notification that imaging is performed outside of the applicable period when the first information is received from the server by the network.

11. The system according to claim 1, wherein:
the one process has a valid area set in advance;
the information processing terminal includes a locator that acquires position information of the information processing terminal based on a received position signal;
the second processor is programmed to determine whether or not the information processing terminal is positioned within the valid area based on the position information acquired from the information processing terminal;
the second processor is programmed to instruct the network to transmit the selection information to the information processing terminal when the information processing terminal is determined to be within the valid area, and transmit second information to the information processing terminal when the information processing terminal is determined to be outside the valid area; and
the first processor is programmed to:
instruct the network to transmit the position information acquired by the locator, in addition to the acquired information and the terminal identifier, to the server;

perform the one process based on the selection information when the selection information is received from the server by the network in response to the transmission; and give notification that the information processing terminal is outside of the valid area when the second information is received from the server by the network in response to the transmission.

12. The system according to claim 11, wherein:

the one process has an applicable period set in advance;

the second processor is programmed to transmit the selection information to the information processing terminal by the network when imaging is performed within the applicable period, and transmit first information to the information processing terminal by the network when imaging is performed outside of the applicable period; and the first processor is programmed to perform the one process based on the selection information when the selection information is received from the server by the network, and give notification that imaging is performed outside of the applicable period when the first information is received from the server by the network.

13. The system according to claim 1, wherein:

the second processor is programmed to transmit third information to the information processing terminal by the network when the terminal identifier is not included in the information received by the receiver; and the first processor is programmed to perform the one process based on the selection information when the selection information is received from the server by the network, and give notification that an unreadable information code has been imaged when the third information is received from the server.

14. The system according to claim 1, wherein:

the second processor is programmed to store and manage the code identifier and the terminal identifier used in selection of the one process.

15. The system of claim 1, wherein more than one process is associated with one of the terminal identifiers.

16. The system of claim 1, wherein more than one process is associated with one of the code identifiers.

17. A server for incorporation in a system for reading an information code, the system comprising an information processing terminal imaging an information code, the server communicating with the information processing terminal, the information code including i) decode data to be decoded and ii) a code identifier for differentiating the information code from another information code, the server comprising:

a database configured to store: a plurality of code identifiers including the code identifier, a plurality of terminal identifiers including a terminal identifier of the processing terminal, and a plurality of processes, such that more than one process is associated with either one of the plurality of terminal identifiers or one of the plurality of code identifiers;

a receiver configured to receive, as a decode request transmitted via a network from the processing terminal, the terminal identifier of the terminal and information acquired by the processing terminal from the information code including the decode information and the code identifier; and a processor programmed to:

decode the decode information to acquire decoded data;

access the database to select, among the plurality of processes, the one process associated in the database with both the acquired code identifier and the received code identifier such that different processes are associated with different terminal identifiers for a same image of the information code; and transmit, as a decode response, the decoded data and selection information identifying the one process, to the information processing terminal via the network to instruct the terminal to perform the one process responsive to the imaging of the information code.

18. The server according to claim 17, wherein the processor is programmed to:

decode the decode information based on the acquired information;

interpret and the code identifier based on the acquired information; and transmit the interpreted code identifier to the information processing terminal.

* * * * *